Feb. 27, 1940.   F. W. STURM   2,191,870
LIQUID DISPENSING APPARATUS
Filed Aug. 14, 1937   6 Sheets-Sheet 2
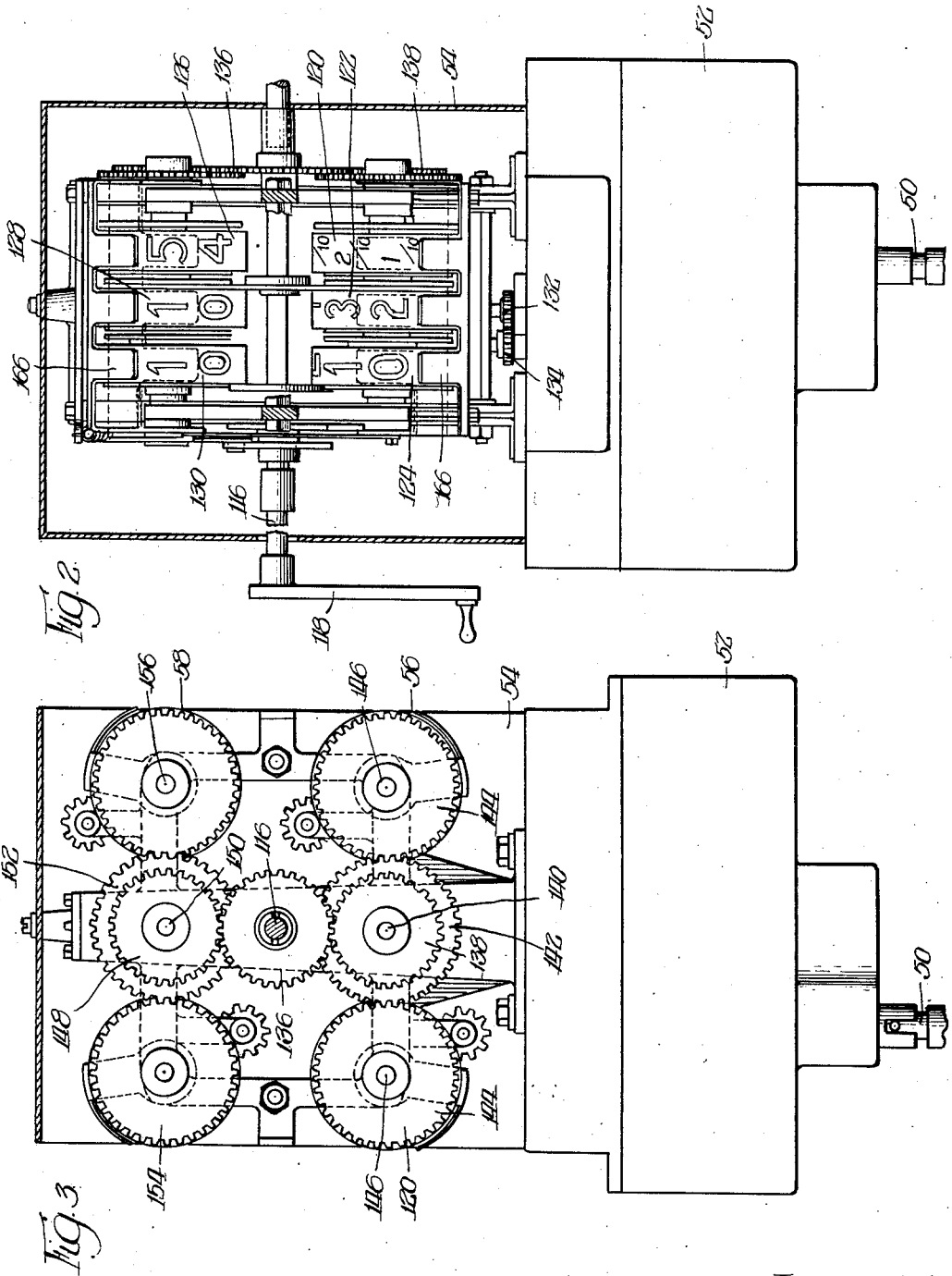
Inventor:
Frederick W. Sturm, Feb. 27, 1940.　　　F. W. STURM　　　2,191,870
LIQUID DISPENSING APPARATUS
Filed Aug. 14, 1937　　　6 Sheets-Sheet 3
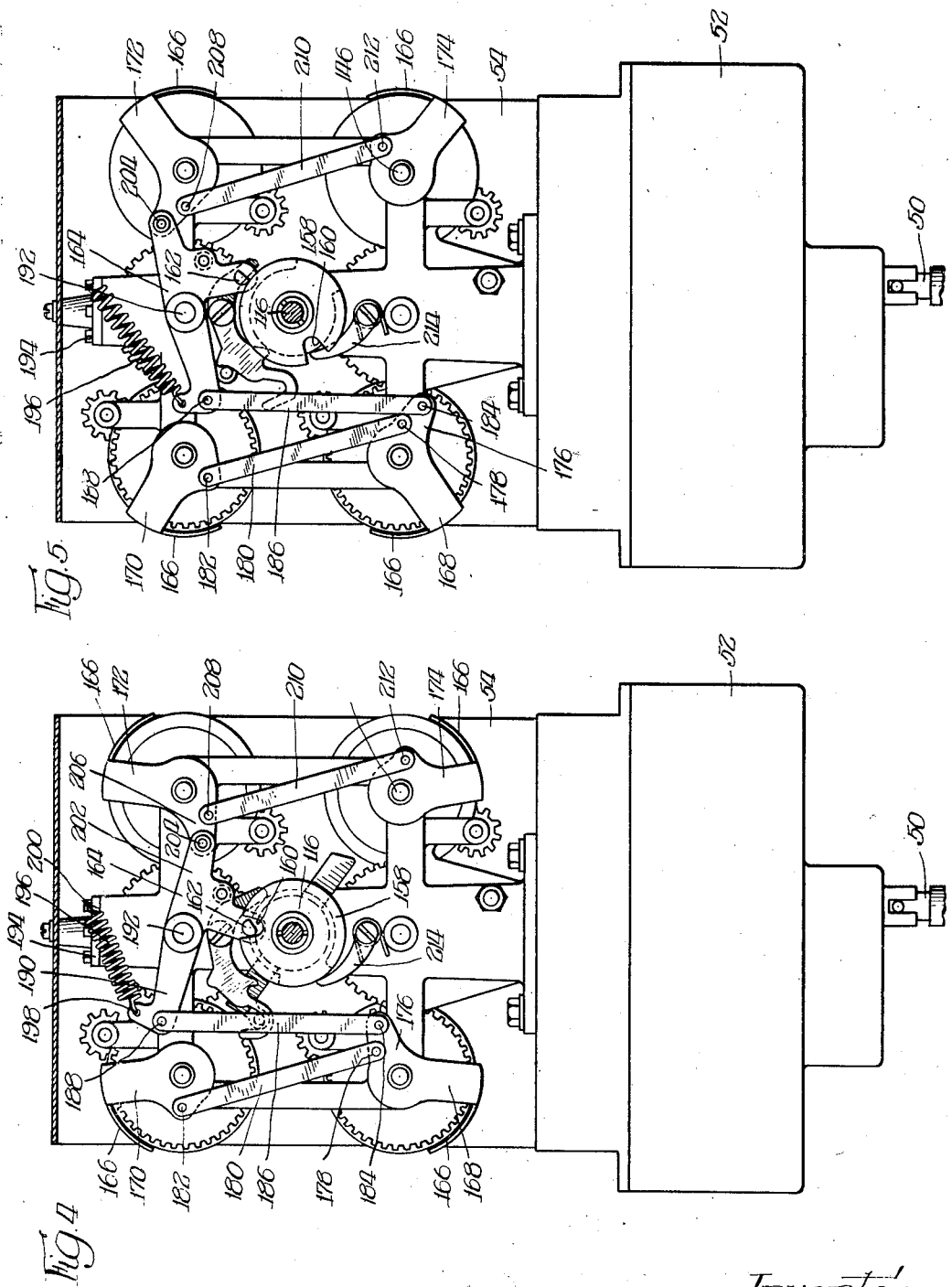
Inventor:
Frederick W. Sturm
By Wilkinson, Huxley, Byron & Knight Attys Feb. 27, 1940. F. W. STURM 2,191,870
LIQUID DISPENSING APPARATUS
Filed Aug. 14, 1937 6 Sheets-Sheet 4
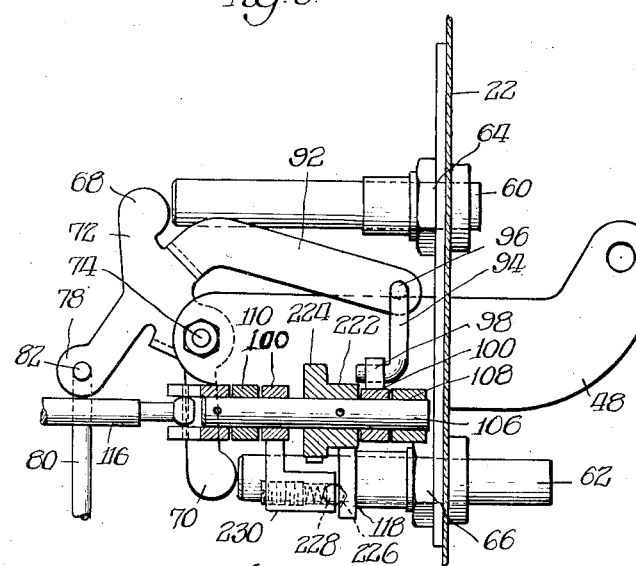
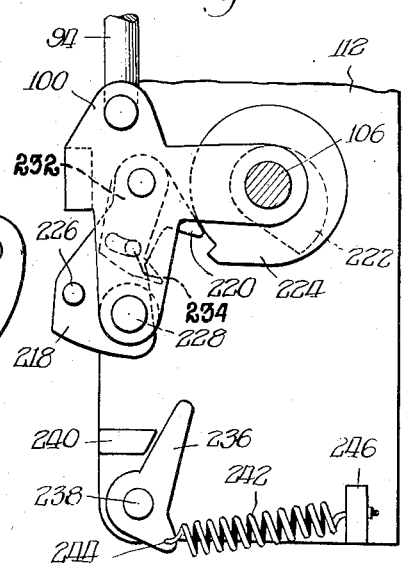
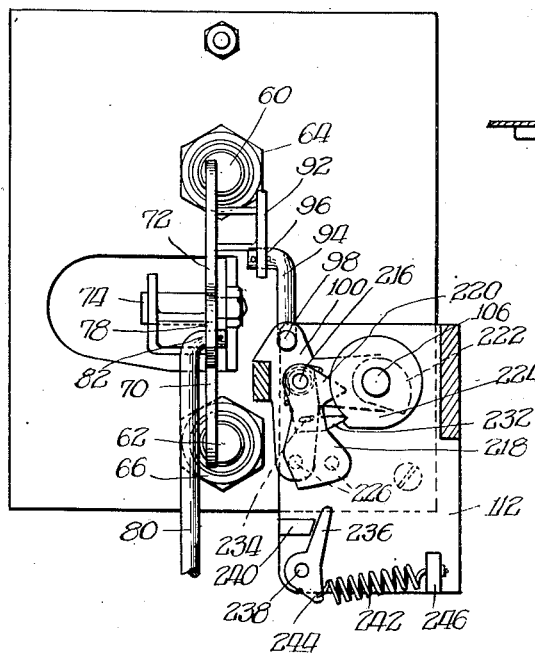
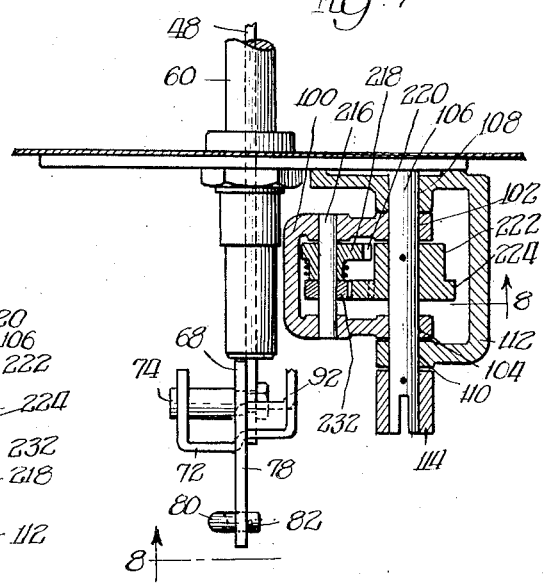
Inventor:
Frederick W. Sturm.
By Wilkinson, Huxley, Byron & Knight
Attys Feb. 27, 1940. F. W. STURM 2,191,870
LIQUID DISPENSING APPARATUS
Filed Aug. 14, 1937 6 Sheets-Sheet 5
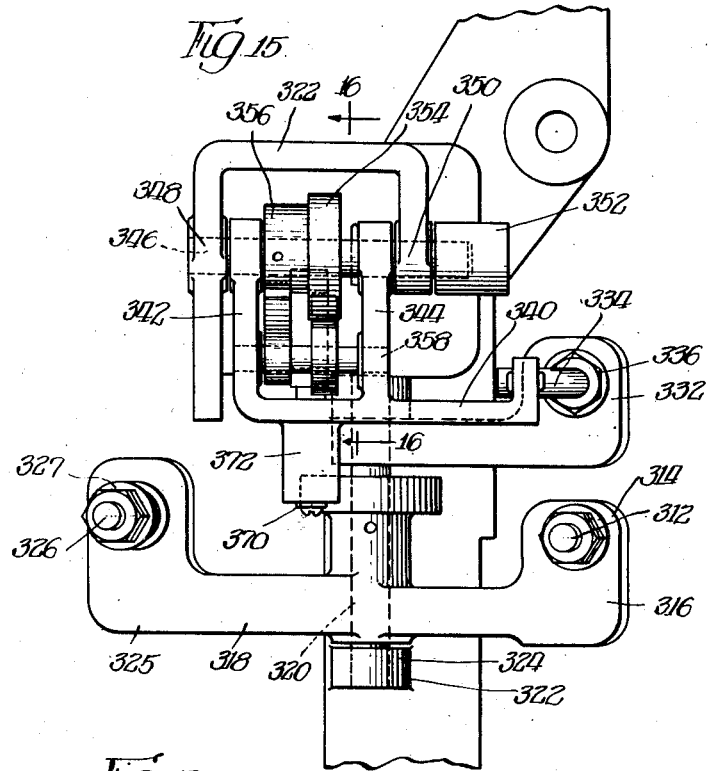
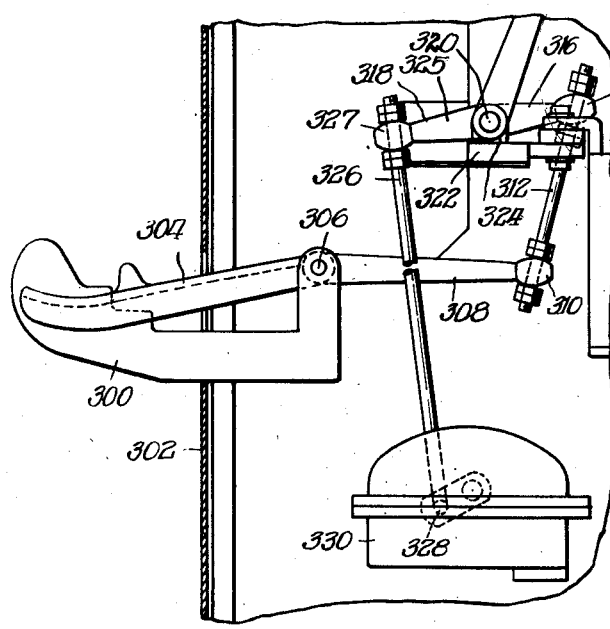
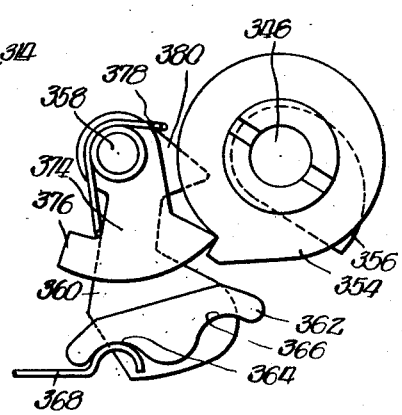
Inventor
Frederick W. Sturm,
By Dickinson, Huxley, Byron & Knight
Attys Feb. 27, 1940. F. W. STURM 2,191,870
LIQUID DISPENSING APPARATUS
Filed Aug. 14, 1937 6 Sheets-Sheet 6

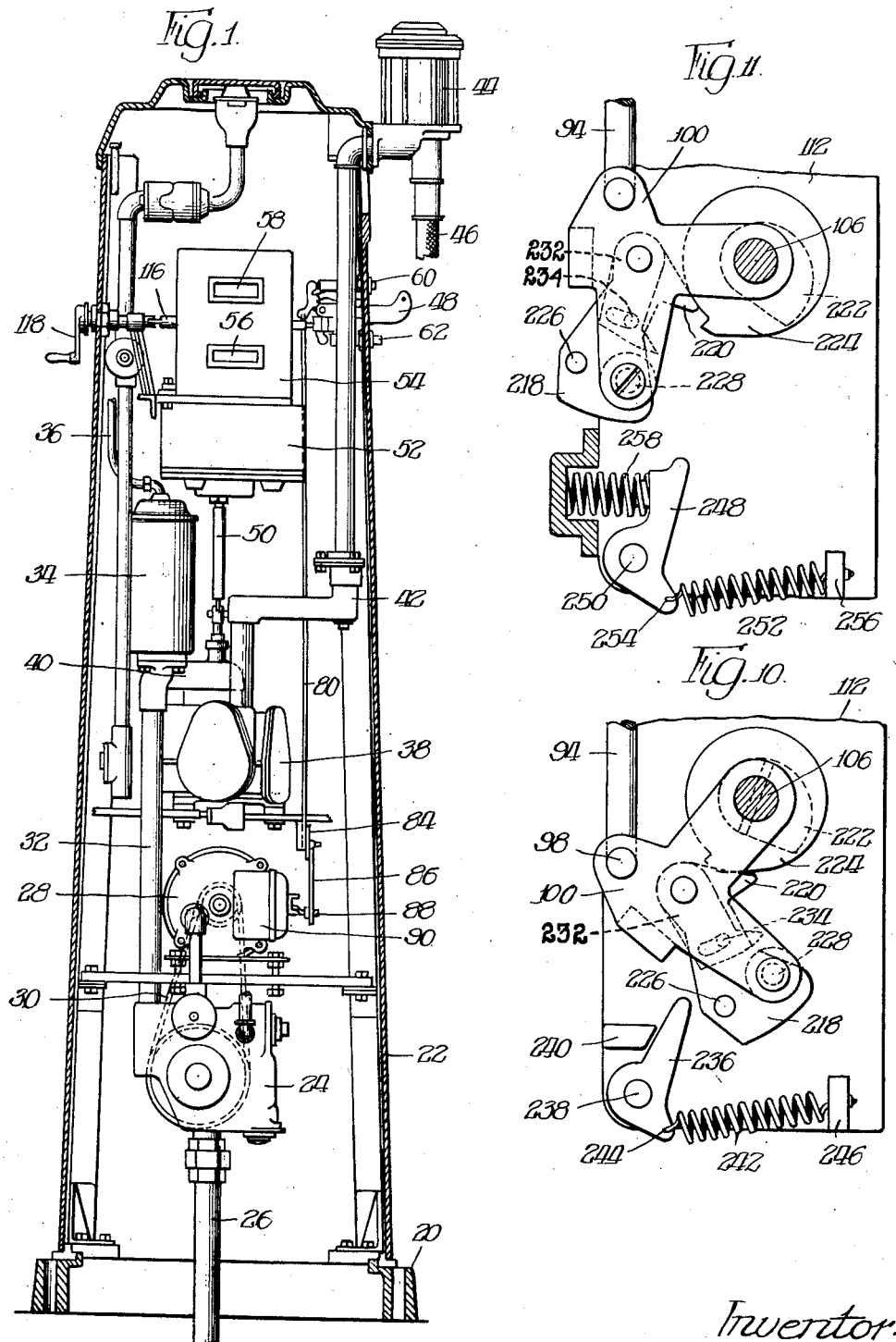

Inventor:
Frederick W. Sturm,
By Wilkinson, Huxley, Byron v Knight
Attys

Patented Feb. 27, 1940

2,191,870

UNITED STATES PATENT OFFICE 2,191,870

LIQUID DISPENSING APPARATUS

Frederick W. Sturm, Fort Wayne, Ind., assignor to The Wayne Pump Company, Fort Wayne, Ind., a corporation of Maryland Application August 14, 1937, Serial No. 159,147

20 Claims. (Cl. 221—95)

This invention pertains to a liquid dispensing apparatus.

An object of this invention is to provide a liquid dispensing apparatus wherein the indicating means thereof should be set at initial position before each dispensing operation.

Another object of the invention is to provide a liquid dispensing apparatus wherein after an amount of liquid has been dispensed, it is desirable to reset the indicating means of the liquid dispensing apparatus to its initial zero position before an additional amount can be dispensed.

Still another object of the invention is to provide a liquid dispensing apparatus using a counter or direct reading type of indicating mechanism wherein resetting occurs in the registering direction of said counter or counters, and wherein means is provided for preventing visible reading of the indicating mechanism while the counter is being reset to zero.

A further object of the invention is to provide a liquid dispensing apparatus wherein the indicating means is rendered inoperative even though the starting switch is closed until and unless the indicator is set at zero.

A still further object of the invention is to provide a liquid dispensing apparatus wherein the indicator is rendered visibly inoperative unless the liquid dispensing apparatus is operated in a certain prescribed manner.

With these and various other objects in view, the invention may consist of certain novel features of construction and operation as will be more fully described and particularly pointed out in the specification, drawings and claims appended hereto.

In the drawings, which illustrate embodiments of the device, and wherein like reference characters are used to designate like parts—

Figure 1 is a sectional elevation of a liquid dispensing apparatus having one form of means embodying the invention thereon whereby the counter or indicator should be set to zero before a dispensing operation is initiated;

Figure 2 is an enlarged sectional elevation of the counter and variator mechanism adapted to be used in a liquid dispensing apparatus embodying the invention;

Figure 3 is an enlarged side elevation of the counter and variator mechanism illustrated in Figure 2 as viewed at the right side of said figure, showing certain of the mechanism necessary for resetting the device to zero;

Figure 4 is an enlarged side elevation taken at the left of Figure 2 showing the shutter control mechanism, the shutter in said figure being in open or normal position when liquid is to be dispensed from the liquid dispensing apparatus;

Figure 5 is an enlarged side elevation corresponding to Figure 4 showing the indicator mechanism in position with the shutters closed or in the position for or during resetting;

Figure 6 is an enlarged fragmentary sectional elevation taken adjacent the stationary hose hook showing the switch operating means in inoperative position, and showing certain of the shutter control mechanism;

Figure 7 is an enlarged sectional top plan view of the construction illustrated in Figure 6, a portion of the shutter control being shown in section;

Figure 8 is an enlarged transverse elevation, partly in section, showing the switch operating mechanism in switch open position, and the parts of the shutter control in a position where the indicator has not as yet been reset, the section being taken substantially in the plane as indicated by the line 8—8 of Figure 7;

Figure 9 is an elevation corresponding to Figure 8 showing the parts in switch open position, but where setback of the indicator has been made;

Figure 10 is an elevation corresponding to Figure 8 showing the parts in switch closed position and where the indicator was reset to zero before the motor was started;

Figure 11 is an elevation corresponding to Figure 9 showing a modified form of device;

Figure 12 is a fragmentary sectional elevation through a form of liquid dispensing apparatus having a modified shutter control device provided thereon;

Figure 15 is a top plan view of the device illustrated in Figures 13 and 14;

Figure 16 is an enlarged sectional elevation taken substantially in the plane indicated by the line 16—16 of Figure 15.

Figure 13:
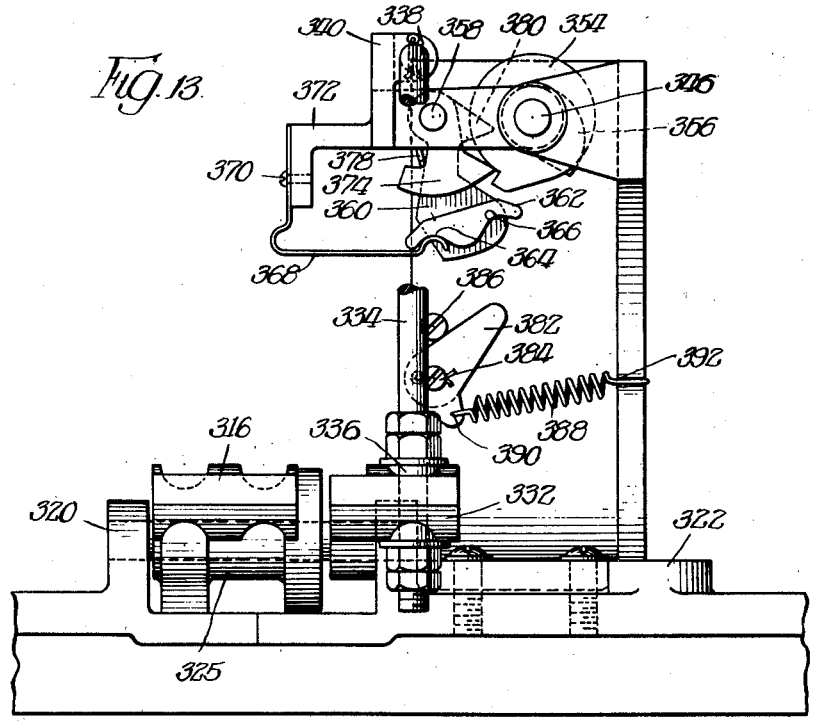
Figure 13 is an enlarged fragmentary elevation through the shutter control device of the liquid dispensing apparatus illustrated in Figure 12.

Referring first of all more particularly to the form of the control device illustrated in Figures 6 to 11 inclusive, as associated with a liquid dispensing apparatus and indicating mechanism, such as shown in Figures 1 to 5 inclusive, the liquid dispensing apparatus consists essentially of a base 20, having secured thereto a casing or housing 22 within which is mounted the pump 24. The suction side of said pump is connected through the pipe 26 to a source of liquid supply (not shown), the pump illustrated being adapted to be operated by means of the electric motor 28 connected to said pump by means of the belt 30. The outlet side of the pump is connected through the pipe 32 with the air separator 34, said air separator having the vapor outlet 36 and being connected to the inlet side of the meter 38 as at 40. The outlet side of the meter is connected through the piping 42 with the sight gauge 44 to which is connected the hose 46. The end of the hose is provided with a discharge nozzle (not shown), flow through the nozzle being controlled through the usual valve and control lever disposed within a guard, which also serves as a nozzle support adapted for supporting engagement with the stationary hose hook 48.

The meter 38 which, as shown, is of the displacement type, is provided with a rotatable meter shaft 50 adapted to be rotated by the liquid passing through the meter, said shaft being coupled to the speed variator mechanism disposed in the housing 52 of the indicator 54. The speed variator mechanism is adapted to be used with a computing type of pump, particularly shown and described in Patent No. 2,111,996 to Edward A. Slye, granted March 22, 1938.

The indicator is provided with the windows 56 and 58 having disposed therein suitable numeral wheels such as to be later described for indicating the amount of liquid dispensed and the price of said liquid.

The hose in inoperative position is adapted to be supported through the guard on the fixed support 48 and in supported position is adapted to prevent operation of the switch. When the switch is in open position the plunger 60 mounted immediately above the support is in its innermost position, while the plunger 62 mounted below the support 48 is in its outermost position, all as illustrated in Figure 6.

The plungers 60 and 62 extend through suitable fittings 64 and 66 provided in the casing 22 and the inner ends thereof are adapted to have cooperative engagement with the upper and lower arms 68 and 70 of the bell crank 72. Bell crank 72 is pivotally mounted as at 74 and is provided with the arm 78 to which the rod 80 is pivotally connected as at 82. The lower end of the rod 80 is pivoted through the lever 84 to the rod 86. The rod 86 is pivotally connected as at 88 to the motor switch 90.

When the plunger 60 is in its innermost position, such as shown in Figure 6, the switch 90 is open. When the plunger 62 is moved inwardly the bell crank 72 is rotated in a clockwise direction to move the rod 80 upwardly to close the switch, whereupon the motor is started and liquid may be dispensed in the usual manner. The bell crank 72 is also provided with the extended arm 92, to which the rod 94 is pivoted as at 96. The lower end of the rod 94 is pivoted as at 98 to the frame 100, said frame being pivotally journaled as at 102 and 104 on the jack shaft 106, said jack shaft being journaled as at 108 and 110 on the fixed support 112.

The jack shaft 106 is provided with the coupling 114 constituting a connection to an extension of the reset shaft 116 of the indicator; said reset shaft being provided with the reset crank 118 which may be manually operated to reset the indicator mechanism to initial position.

When liquid is drawn from the source of liquid supply through the pipe 26 it is forced by the pump 24 to the meter 38 and through the pipe 32. Operation of the nozzle valve permits the liquid to pass through the meter, causing rotation of the meter shaft 50, movement of the shaft being proportional to the amount of liquid discharged, thus causing the amount of the liquid to be shown in the window 56 and the cost of the liquid to be computed by the variator and indicated in the window 58. The operation of the variator and the indicator by the meter is accomplished in a well known manner and as described in the aforementioned application. The indicator is of the conventional construction used in applicant's assignee's computing pump and consists essentially of amount indicating wheels 120, 122 and 124 disposed in the lower window 56 and on each side of the liquid dispensing apparatus, said numeral wheels indicating tenths, units and tens of units dispensed as, for example, gallons.

Complete rotation of the lower value numeral wheels serves to operate the succeeding numeral wheel through one unit, for example, a complete rotation of the numeral wheel 120 serves to operate the numeral wheel 122 through one unit of movement, that is, a tenth of a revolution in the construction shown. The cost numeral wheels are disposed in the upper window 58 on each side of the apparatus and consist of the numeral wheels 126, 128 and 130 indicating cents, tens of cents and dollars, respectively, the operation of such numeral wheels being similar to the operation of the amount numeral wheels, that is, rotation of the lower valued price wheel through a complete revolution serves to move the succeeding numeral wheel through a tenth of a revolution thereof. The amount and price wheels are adapted to be operated upon passage of liquid through the meter by the shafts 132 and 134, all as described in the above referred to application.

In order to reset the indicator 54 the reset shaft 116 is provided with the reset crank 118, and said reset shaft on one side thereof is provided with the gear 136 meshing with the gear 138 mounted on the shaft 140. The gear 138 is non-rotatably provided with the gear 142 meshing with the gears 144 non-rotatably mounted on the shafts 146 of the amount indicating wheels. The gear 136 likewise meshes with the gear 148 mounted on the shaft 150, gear 148 being provided with the gear 152. The gear 152 meshes with gears 154 non-rotatably mounted on shafts 156 on which the cost indicating wheels are mounted. At the opposite sides of the indicator the shaft 116 is provided with the disc 158 non-rotatably mounted thereon, said disc being provided with the notch 160 disposed to receive the pin 162 mounted on the lever 164 when the shaft 116 is in a position wherein the numeral wheels indicating both price and amount are disposed at zero, it being understood that one revolution of the shaft 116 will reset the numeral wheels to zero.

In the indicator shown, resetting of the numeral wheels is in the direction of registration, that is, rotation of the shaft 116 by the crank 118 causes rotation of the shafts 146 and 156 by the gear 136 and the gears 138, 148, 144 and 154, so that the numeral wheels are picked up in the normal direction of registration of said numeral wheels. In order, therefore, to provide means for preventing visible indication of the indicator while resetting, shutters 166 are provided. Said shutters are disposed adjacent each numeral wheel and are pivotally mounted by means of the frame members 168, 170, 172 and 174 on the shafts 146 and 156. The frame member 168 is provided with the arm 176 which is pivotally connected as at 178 to the link 180, the other end of which is connected as at 182 to the frame 170. The arm 176 is also pivotally connected as at 184 to the link 186 which is pivotally connected at its other end as at 188 to the arm 190 of the member 164, said member being pivoted as at 192 to the frame or support 194 of the indicator, the arm 190 being normally urged in a clockwise direction by means of the contractile spring 196 secured to said arm at 198 and to the support 194 as at 200. The member 164 is provided with the portion 202 having the pin 162 thereon and is pivotally connected as at 204 to the arm 206 of the frame 172. The arm 206 is pivotally connected as at 208 to the link 210, the other end of which is pivotally connected as at 212 to the frame 174.

A spring pressed pawl 214 is provided adapted to engage shoulders on the member 158 for preventing reverse operation thereof until the shutters fall, and then backward rotation of the numeral wheels is prevented by a clutch (not shown) interposed between the shaft 116 and the numeral wheels. It will thus be seen that rotation of the shaft 116 causes the pin 162 to be moved out of the notch 160 to thereupon move the member 164 in a counterclockwise direction, causing the shutters 166 to be dropped over their respective numeral wheels, whereupon during reset operation of the numeral wheels no visible operations can be seen in the windows 56 and 58; and the shutters will not be moved out of obstructing position by the spring 194 until the pin 162 again registers with the notch 160, at which time the numeral wheels will all be reset to the zero position.

The frame 100 is provided with a shaft 216 on which there is mounted a pawl support 218, spring pressed in a counterclockwise direction, said support being provided with the extension or projection 220 disposed in the path of movement of the throwout cam 222 of the one-toothed ratchet 224 fixedly mounted on the adjacent shaft 106. The pawl support is provided with two indentations or recesses 226 for receiving spring-pressed ball 228 mounted in the housing 230, provided on the frame 100. A pawl 232 is pivotally mounted on the shaft 216 adjacent the pawl support 218, and is limited in its relative movement with respect to the pawl support by the pin and slot 234, the pawl 232 being disposed in the path of movement of the one-toothed ratchet 224. The fixed support 112 is provided with a trip pawl 236 pivoted as at 238 and urged in a counterclockwise direction against the stop 240 by the contractile spring 242, one end of said spring being connected as as 244 to the trip pawl, and the other end being connected as at 246 to the fixed support.

Assuming that the indicator has been reset to zero and the switch is in open position, and it is desired to serve liquid, the nozzle is removed from the support 48 and the plunger 62 is moved inwardly. Movement of the plunger inwardly moves the bell crank 72 in a clockwise direction to close the switch 90 whereupon dispensing operation may occur. Movement of the bell crank in a clockwise direction causes downward movement of the rod 94, but, as the indicator had been previously reset to zero, during said reset the throwout cam 222 had engaged the projection 220 of the pawl support 218 and had moved the pawl support and the pawl 232 to the position shown in Figure 9, wherein the spring pressed ball had engaged in the right hand depression as shown in Figure 9, that is, the pawl had been moved to non-ratcheting position. Upon moving the switch to closed position, the parts were moved to the position shown in Figure 10, in which the pawl support had moved past the trip pawl 236. After the dispensing operation the plunger 60 is moved to its innermost position, causing movement of the bell crank 72 in a counterclockwise direction, whereupon the rod 80 has been moved downwardly to open said switch. The rod 94 is moved upwardly causing the trip pawl 236 to engage the pawl support 218 and move it to the position shown in Figure 8 where the spring pressed ball engages in the left hand depression, causing the pawl 232 to be moved into ratcheting position. If in this position the plunger 62 is moved inwardly to switch closing position, the frame 100 will be moved downwardly causing the pawl 232 to move the one-toothed ratchet wheel substantially 50 deg., thereby causing rotation of the shaft 106, and consequently the reset shaft, causing the shutters to be lowered. In this position registration cannot be viewed and any gasoline dispensing cannot be visibly measured. When the parts are in the position as shown in Figure 8, if the reset shaft 116 is rotated to reset the indicator, the throw-out cam 222 will be rotated 360 deg. to engage the projection 220 and move the pawl support to the position as shown in Figure 9, in which position the pawl 232 is inoperable and liquid may be dispensed and visibly measured.

In a device of this character, the amount of force required to drop the shutters of the computing device when starting of the motor has been made improperly, that is, before reset is effected, is sufficient to warn the operator of the pump that reset has not been made so that he will not dispense gasoline for which he cannot make a charge.

In the device shown in Figure 11, the trip pawl 248 is simply a modification of the pawl 236, being pivotally mounted as at 250 on the fixed support 112 and urged in a counterclockwise direction by means of the spring 252 secured as at 254 to the trip pawl and at 256 to the fixed support. A relatively stiff spring 258 is interposed between the trip pawl 248 and the fixed support so that if setback has been partially made no damage will occur by virtue of an operation of the switch closing mechanism, i. e., no jamming can occur between the pawl support and the trip pawl, yet the spring 258 is stiff enough to move the pawl support from its position shown in Figure 11 to one where the left hand depression 226 is engaged by the spring pressed ball carried by the frame 100.

Figure 14:
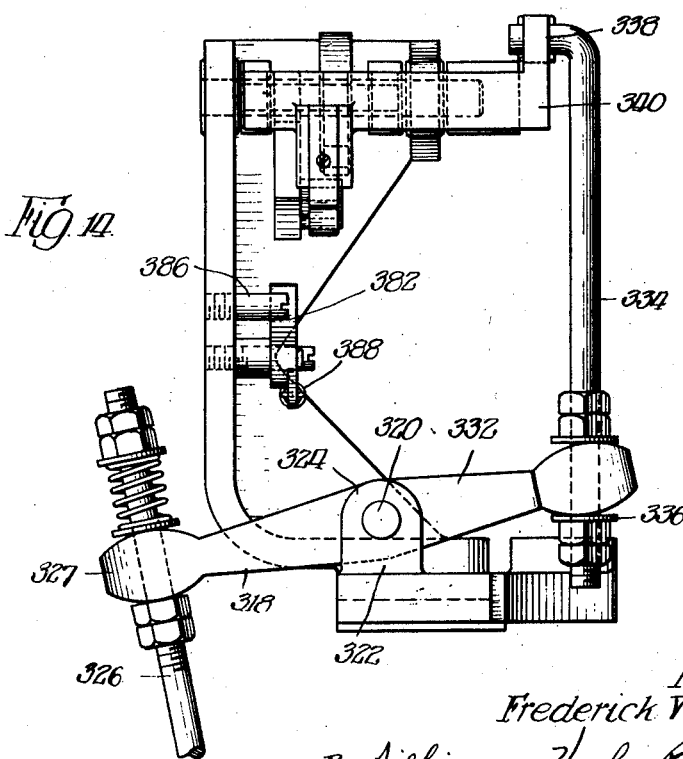
Figure 14 is an enlarged fragmentary sectional elevation of the device illustrated in Figure 13, the same being taken substantially at right angles thereto.

Referring now to the construction illustrated in Figures 12 to 16 inclusive, the essential parts of the liquid dispensing apparatus are similar to those illustrated in Figure 1. Certain parts have been relocated, however, by virtue of a different form of switch control. In this construction the stationary hose hook 300 is supported within the casing 302 of the liquid dispensing apparatus, and the switch control member 304 is disposed adjacent thereto and is pivoted as at 306 within said casing. The switch control member 304, when in its lowermost position, is in switch open position, and at no time does it form a support for the nozzle. The member 304 is provided with an extension 308 disposed inwardly of the pivot 306 and is pivotally connected as at 310 to the rod 312, said rod extending upwardly and being pivotally connected as at 314 to the arm 316 of the lever 318. The lever 318 is fixedly mounted on the shaft 320, said shaft being journaled in the fixed support 322 as at 324, and said lever 318 is provided with an extension 325 to which the rod 326 is pivoted as at 327. The rod 326 extends downwardly and is pivotally connected as at 328 to the motor switch 330.

The shaft 320 is provided with the arm 332 fixed thereto, and to said arm the rod 334 is pivotally connected as at 336. The rod 334 extends upwardly and is pivotally connected as at 338 to the frame member 340, said frame member being provided with the spaced arms 342 and 344 pivotally mounted on the jack shaft 346. The jack shaft 346 is journaled on the spaced journals 348 and 350 on the stationary support 322, the jack shaft being provided with the coupling 352 similar to the coupling 114 and adapted to be connected to the extension of the indicator shaft 116.

The shaft 346 is provided with a single toothed ratchet wheel 354 and the throw-out cam 356 fixed to said shaft. The frame 340 is provided with the shaft 358 on which the pawl support 360 is pivoted, said pawl support being provided with the member 362 having the spaced stop seats 364 and 366 disposed thereon, said seats being adapted to be engaged by the spring 368 secured as at 370 to the bracket 372 provided on the frame member 340. The pawl 374 is likewise pivoted to the shaft 358, being provided with the extending or overlying stop 376 adapted to engage the pawl support 360 and normally urged against said support by means of the spring 378. The pawl 374 is disposed in the path of the single toothed ratchet 354, and the extension 380 of the pawl support is disposed in the path of the cam 356. A trip pawl 382 is pivotally supported as at 384 to the fixed support 322 and normally engages a stop 386, being urged in a counterclockwise direction by means of the contractile spring 388 secured as at 390 to said pawl, the other end of said spring being connected as at 392 to the stationary support.

Assuming the liquid dispensing apparatus to be set at zero, as after a reset operation, and that it is desired to dispense an amount of liquid, the nozzle is removed from the stationary support 300 and the switch control member is moved upwardly. Movement of the switch control member 304 upwardly closes the switch 330 to start the motor, whereupon liquid may be served in the well known manner. When the switch control member 304 is moved upwardly, the rod 312 moves downwardly, causing downward movement of the rod 334. Downward movement of the rod 334 causes rotation of the frame member 340 about the shaft 346 in a counterclockwise direction as viewed in Figure 13.

As it has been assumed that the indicator has been reset to zero prior to the closing of the switch, the seat 366 will be engaged by the spring 368, and the projection of the pawl 374 will not engage the one-toothed ratchet 354. It is understood, of course, that the seat 366 is moved to spring engaging position by rotation of the reset shaft 116 of the indicator, causing rotation of the shaft 346, whereupon the throw-out cam 356 will engage the projection 380 to move the pawl support, and consequently the pawl 374 through shoulder 376, in a clockwise direction about the pivot 358. Movement of the supporting frame 340 will cause the pawl support to be moved past the trip pawl 382 so that when the switch control member 304 is moved downwardly to open the switch, the frame member 340 will be returned to the position shown in Figure 13 and, in moving back to this position, the pawl support will engage the trip pawl 382 to cause the seat 364 to be moved to engage the spring 368.

If then, the operator closes the switch without reset, the frame 340 will be moved in a counterclockwise direction, and the pawl 374 will engage the one-toothed ratchet 354 to rotate the jack shaft 346, and consequently the reset shaft 116, through substantially 50 deg. to cause the shutters to fall to the position as illustrated in Figure 5 where no visible indications can be read. As before, of course, the operator is notified by the resistance of the switch control member that the indicator has not been reset to initial position.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a device of the character described, the combination of indicating mechanism having indicating means, shutters for concealing said indicating means during reset, a reset shaft, liquid forcing means, a control for said liquid forcing means, a pivoted frame movable with said control, said frame having a pawl support thereon movable between two positions, a pawl movable with said pawl support, a trip pawl for moving said pawl to one position, a cam controlled by operation of said reset shaft for moving said first pawl and pawl support to the other position, and means engageable by said first pawl when said pawl support is in one position for moving the shutters to concealing position upon operation of said control unless said indicating mechanism is moved to initial position.

2. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, means associated with said control and said reset means for operating said shutter upon starting said control means whereby said indicator must be reset to zero for visible registration of liquid dispensed from said apparatus, said second named means including a ratchet member movable to cause the shutter to obstruct said indicator, said ratchet member being provided with a cam member, a member disposed adjacent said ratchet and movable with respect thereto, and a connection between said control and said last named member, said last named member being provided with means controlled by said cam member rendering said means inoperative with respect to said ratchet member when the indicator has been set to zero position.

3. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, and means associated with said control and said reset means for operating said shutter upon starting said control means whereby said indicator must be reset to zero for visible registration of liquid dispensed from said apparatus, said means including a single tooth ratchet wheel mounted on said reset shaft, a pawl connected to said control and associated with said single tooth ratchet wheel whereby movement of said control to start said pump operates said ratchet to close said shutter.

4. In a device of the character described, the combination of liquid dispensing means, indicating means having indicia for showing the amount of liquid dispensed, reset means for said indicating means, control means for controlling flow through said liquid dispensing means, concealing means operable by said control means to conceal the indicia until said indicating means has been reset to a predetermined position, and means operatively associated with said concealing means including a plurality of latch members for causing said concealing means to be moved to concealing and revealing positions.

5. In a device of the character described, the combination of liquid dispensing means, indicating means having indicia for showing the amount of liquid dispensed, reset means for said indicating means, control means for controlling flow through said liquid dispensing means, concealing means operable by said control means to conceal the indicia until said indicating means has been reset to a predetermined position, and means operatively associated with said concealing means including a plurality of bodily movable pivotally mounted latch members controlled by said indicating means and said control means for causing said concealing means to be conditioned to concealing or revealing positions.

6. In a device of the character described, the combination of liquid dispensing means, indicating means having indicia for showing the amount of liquid dispensed, reset means for said indicating means, control means for controlling flow through said liquid dispensing means, concealing means adapted to conceal the indicia, means operably connected to said indicating means and said concealing means for rendering said concealing means inoperative to conceal said indicia if the control means is initiated after said indicating means has been reset to a predetermined position, said sixth named means including a movable member associated with said concealing means and said control means, and a member for rendering said last named member inoperative when said reset means returns said indicating means to the predetermined position.

7. In a device of the character described, the combination of liquid dispensing means, a meter for measuring the liquid dispensed through said dispensing means, indicating means operated in accordance with the liquid passing through said meter and having indicia for showing the amount of liquid dispensed, reset means for said indicating means, control means for controlling flow through said liquid dispensing means, concealing means operable to conceal the indicia until said indicating means has been reset to a predetermined position, means operably connecting said reset means and said concealing means for rendering said concealing means inoperative to conceal said indicia when said reset means has moved said indicating means to said predetermined position, said sixth named means including a movable member associated with said concealing means and said control means, and a member for rendering said last named member inoperative when said reset means returns said indicating means to the predetermined position.

8. In a device of the character described, the combination of liquid dispensing means, a meter for measuring the liquid dispensed through said dispensing means, indicating means operated in accordance with the liquid passing through said meter and having indicia for showing the amount of liquid dispensed, reset means for said indicating means, control means for controlling flow through said liquid dispensing means, concealing means operable to conceal the indicia if dispensing is initiated while the indicating means is in other than a predetermined position, said sixth named means including a movable member associated with said concealing means and said control means, and a member for rendering said last named member inoperative when said reset means returns said indicating means to the predetermined position.

9. In a device of the character described, the combination of liquid dispensing means, a meter for measuring the liquid dispensed through said dispensing means, indicating means operated in accordance with the liquid passing through said meter and having indicia for showing the amount of liquid dispensed, reset means for said indicating means, control means for controlling flow through said liquid dispensing means, concealing means operable to conceal the indicia if dispensing is initiated while the indicating means is in other than a predetermined position, means operably connecting said reset means and said concealing means for rendering said concealing means inoperative to conceal said indicia when said reset means has moved said indicating means to said predetermined position, said sixth named means including a movable member associated with said concealing means and said control means for permitting the control means to operate the concealing means, and a member for rendering said last named member inoperative when said reset means returns said indicating means to the predetermined position.

10. In a fluid dispensing device, an indicator for registering the quantity of fluid dispensed, means for resetting the indicator to zero position, a signal device operatively connected to the resetting means for indicating either that the indicator has or has not been reset to zero position, means associated with said signal device and said first named means for controlling said signal device, said means including a latch member for moving said signal means, and means associated with said indicator capable of rendering said second named means inoperative.

11. In a device of the character described, the combination of a reset shaft, a jack shaft connected thereto, a control member, a bell crank connected to said control member, plungers for operating said bell crank, a frame member pivotally mounted on said jack shaft, a connection between said bell crank and frame member, a cam member and a ratchet member fixed to said jack shaft, a pawl support pivoted to said frame member, a pawl pivoted to said frame member and adapted in one position of said pawl support to engage said ratchet member whereby upon movement of said bell crank said jack shaft is rotated, said cam member being movable to move said pawl support to a position where said pawl is inoperative to engage said ratchet member, spring pressed means for resiliently holding said pawl support in either of said two positions, a trip pawl disposed in the path of movement of said pawl support when said frame is moved, said trip pawl being so disposed as to move said pawl support to a position where said pawl is operative.

12. In a device of the character described, the combination of a reset shaft, a jack shaft connected thereto, a control member, a bell crank connected to said control member, operating means for said bell crank, a frame member pivotally mounted on said jack shaft, a connection between said bell crank and frame member, a cam member and a ratchet member fixed to said jack shaft, a pawl support pivoted to said frame member, a pawl pivoted to said frame member and adapted in one position of said pawl support to engage said ratchet member whereby upon movement of said bell crank said jack shaft is rotated, said cam member being movable to move said pawl support to a position where said pawl is inoperative to engage said ratchet member, spring pressed means for resiliently holding said pawl support in either of said two positions, trip pawl mechanism disposed in the path of movement of said pawl support when said frame is moved, said trip pawl mechanism being so disposed as to move said pawl support to a position where said pawl is operative, said trip pawl mechanism including a pivoted member, a fixed stop, and a spring urging said pivoted member toward said stop.

13. In a device of the character described, the combination of a reset shaft, a jack shaft connected thereto, a control member, a bell crank connected to said control member, operating means for said bell crank, a frame member pivotally mounted on said jack shaft, a connection between said bell crank and frame member, a cam member and a ratchet member fixed to said jack shaft, a pawl support pivoted to said frame member, a pawl pivoted to said frame member and adapted in one position of said pawl support to engage said ratchet member whereby upon movement of said bell crank said jack shaft is rotated, said cam member being movable to move said pawl support to a position where said pawl is inoperative to engage said ratchet member, spring pressed means for resiliently holding said pawl support in either of said two positions, trip pawl mechanism disposed in the path of movement of said pawl support when said frame is moved, said trip pawl mechanism being so disposed as to move said pawl support to a position where said pawl is operative, said trip pawl mechanism including a pivoted member, a resilient stop, and a spring urging said pivoted member toward said stop.

14. In a device of the character described, the combination of a reset shaft, a jack shaft connected thereto, a control member, a pivoted lever connected to said control member, operating means for said lever, a frame member pivotally mounted on said jack shaft, a connection between said pivoted lever and frame member, a cam member and a ratchet member fixed to said jack shaft, a pawl support pivoted to said frame member and having spaced seats thereon, resilient means on said frame member engageable with said seats to resiliently hold said pawl support in different positions, a pawl pivoted to said frame member and adapted in one position of said pawl support to engage said ratchet member whereby upon movement of said pivoted lever said jack shaft is rotated, said cam member being movable to move said pawl support to a position where said pawl is inoperative to engage said ratchet member in which position one of said seats is engaged by said resilient means, a trip pawl disposed in the path of movement of said pawl support when said frame is moved, said trip pawl being so disposed as to move said pawl support to a position where said pawl is operative.

15. In a device of the character described, the combination of a reset shaft, a jack shaft connected thereto, a control member, a pivoted lever connected to said control member, operating means for said lever, a frame member pivotally mounted on said jack shaft, a connection between said pivoted lever and frame member, a cam member and a ratchet member fixed to said jack shaft, a pawl support pivoted to said frame member, a pawl pivoted to said frame member and adapted in one position of said pawl support to engage said ratchet member whereby upon movement of said pivoted lever said jack shaft is rotated, said cam member being movable to move said pawl support to a position where said pawl is inoperative to engage said ratchet member, resilient means for resiliently holding said pawl support in either of said two positions, a trip pawl disposed in the path of movement of said pawl support when said frame is moved, said trip pawl being so disposed as to move said pawl support to a position where said pawl is operative.

16. In a device of the character described, the combination of liquid dispensing means, indicating means having indicia for showing the amount of liquid dispensed, reset means for said indicating means, control means for controlling flow through said liquid dispensing means, concealing means operable by said control means to conceal the indicia until said indicating means has been reset to a predetermined position, and means operatively associated with said concealing means including latch means controlled by said indicating means and said control means for causing said concealing means to be conditioned to concealing or revealing positions.

17. In a device of the character described, the combination of liquid dispensing means, indicating means having indicia for showing the amount of liquid dispensed, reset means for said indicating means, control means for controlling flow through said liquid dispensing means, concealing means operable by said control means to conceal the indicia until said indicating means has been reset to a predetermined position, and means operatively associated with said concealing means including latch means controlled by said reset means and said control means for causing said concealing means to be conditioned to concealing or revealing positions.

18. In a device of the character described, the combination of liquid dispensing means, indicating means having indicia for showing the amount of liquid dispensed, reset means for said indicating means, control means for controlling flow through said liquid dispensing means, concealing means operable by said control means to conceal the indicia until said indicating means has been reset to a predetermined position, and means operatively associated with said concealing means for causing said concealing means to be conditioned to concealing or revealing positions.

19. In a device of the character described, the combination of liquid dispensing means, indicating means having indicia for showing the amount of liquid dispensed, reset means for said indicating means, control means for controlling flow through said liquid dispensing means, concealing means to conceal the indicia until said indicating means has been reset to a predetermined position, and means operatively associated with said concealing means for causing said concealing means to be conditioned to concealing or revealing positions.

20. In a device of the character described, the combination of liquid dispensing means, indicating means having indicia for showing the amount of liquid dispensed, reset means for said indicating means, control means for controlling flow through said liquid dispensing means, concealing means to conceal the indicia until said indicating means has been reset to a predetermined position, and means for causing said concealing means to be conditioned to concealing or revealing positions.

FREDERICK W. STURM.